United States Patent [19]
Nagata

[11] Patent Number: 5,787,359
[45] Date of Patent: Jul. 28, 1998

[54] MOBILE COMMUNICATION SYSTEM INCLUDING RADIO SET HAVING DETECTING REGISTERED POSITION INFORMATION FUNCTION

[75] Inventor: Kimitaka Nagata, Tokyo, Japan

[73] Assignee: NEC Corporation, Tokyo, Japan

[21] Appl. No.: 613,691

[22] Filed: Mar. 11, 1996

[30] Foreign Application Priority Data

Mar. 10, 1996 [JP] Japan ............... 7-050701

[51] Int. Cl.⁶ ........................... H04B 7/00
[52] U.S. Cl. ............ 455/517; 455/433; 455/510; 455/524
[58] Field of Search ............ 455/54.1, 54.2, 455/56.1, 33.2, 33.1, 34.1, 62, 67.1, 67.7, 510, 517, 524, 422, 433, 435, 436, 450; 379/59, 60

[56] References Cited

U.S. PATENT DOCUMENTS

| | | | |
|---|---|---|---|
| 5,361,396 | 11/1994 | Onoe et al. | 455/56.1 |
| 5,400,390 | 3/1995 | Salin | 455/34.1 |
| 5,400,392 | 3/1995 | Nagashima et al. | 455/73 |
| 5,465,288 | 11/1995 | Falvey et al. | |
| 5,548,822 | 8/1996 | Yogo | 455/54.2 |
| 5,577,047 | 11/1996 | Persson et al. | |

FOREIGN PATENT DOCUMENTS

| | | |
|---|---|---|
| 404152724 | 5/1992 | Japan . |
| 5327888 | 12/1993 | Japan . |

*Primary Examiner*—Tan Q. Nguyen
*Assistant Examiner*—Gertrude Arthur
*Attorney, Agent, or Firm*—Sughrue, Mion, Zinn, Macpeak & Seas, PLLC

[57] ABSTRACT

In order to detect the history of movement and current position of a radio set, a mobile communication system stores the current position of movement of a radio set as registered position information together with the position in which the radio set was previously located. The radio set transmits a registered position information request signal when registered position information is requested. When the radio set system receives such a request signal, it transmits to the radio set the registered position information that was stored. The radio set receives and stores this registered position information and displays it on a display unit.

6 Claims, 11 Drawing Sheets

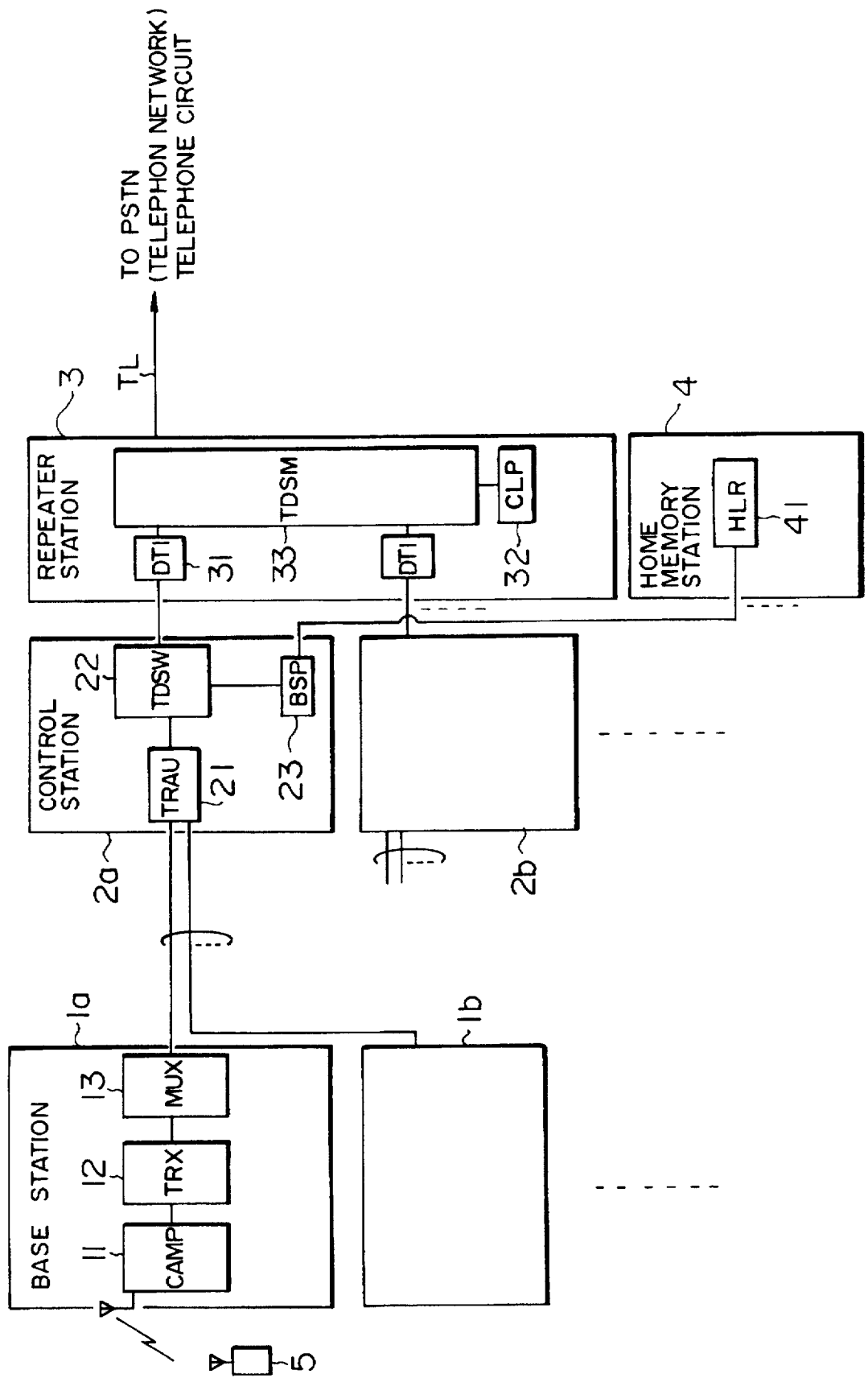

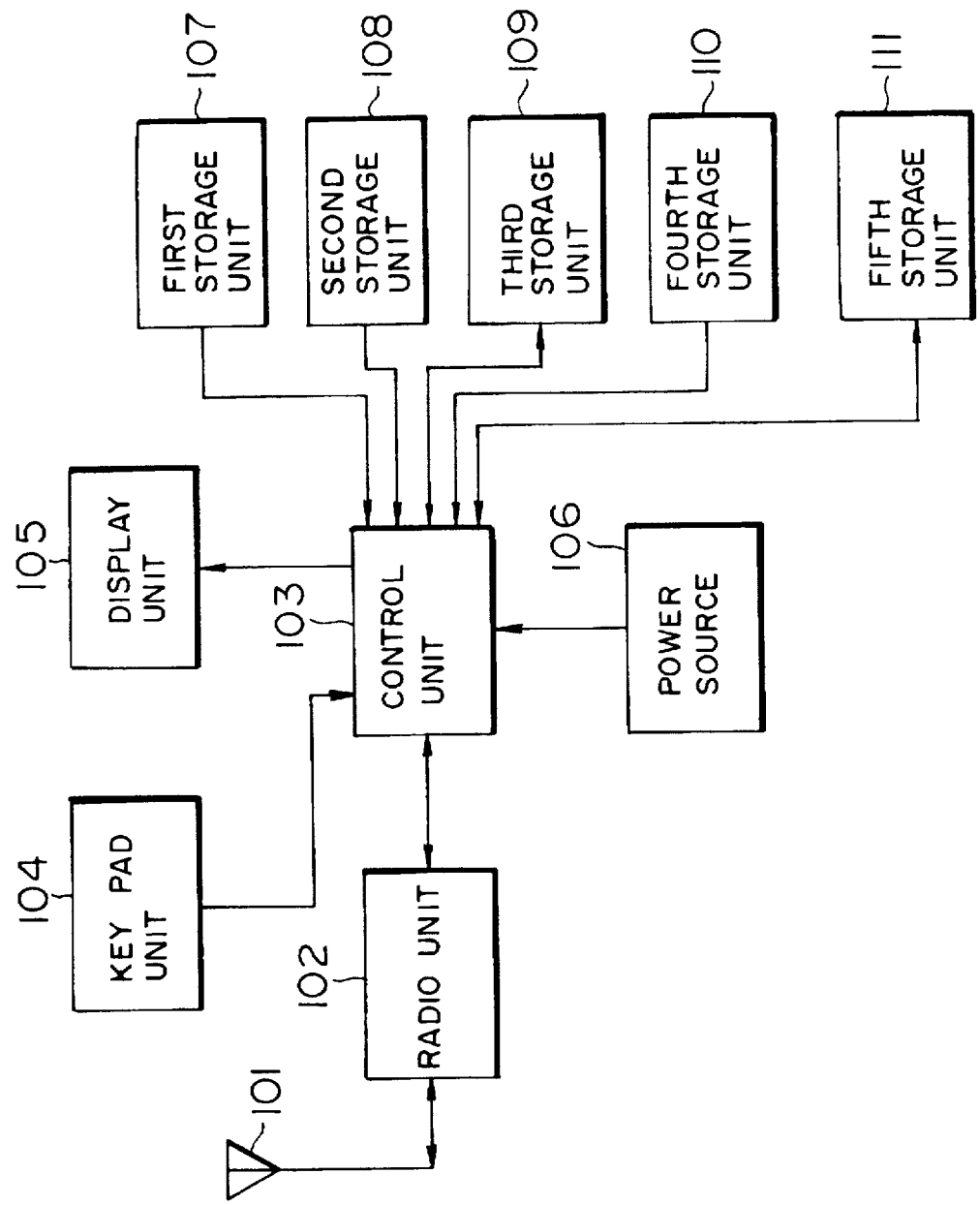

FIG. 7A

| MOBILE STATION IDENTIFICATION NUMBER k | IDENTIFICATION NUMBER ℓ OF REPEATER STATION OF NETWORK IN WHICH THIS STATION'S HOME MEMORY STATION IS TO BE FOUND | IDENTIFICATION NUMBER m OF BASE STATION IN SERVICE ZONE IN WHICH THIS STATION IS CURRENTLY LOCATED |
|---|---|---|

FIG. 7B

| MOBILE STATION IDENTIFICATION NUMBER k | IDENTIFICATION NUMBER ℓ OF REPEATER STATION OF NETWORK IN WHICH THIS STATION'S HOME MEMORY STATION IS TO BE FOUND | IDENTIFICATION NUMBER m OF BASE STATION IN SERVICE ZONE IN WHICH THIS STATION IS CURRENTLY LOCATED | IDENTIFICATION NUMBER n OF CONTROL STATION TO WHICH THE BASE STATION IN SERVICE ZONE IN WHICH THIS STATION IS CURRENTLY LOCATED IS CONNECTED |
|---|---|---|---|

FIG. 7C

| MOBILE STATION IDENTIFICATION NUMBER k | IDENTIFICATION NUMBER ℓ OF REPEATER STATION OF NETWORK IN WHICH THIS STATION'S HOME MEMORY STATION IS TO BE FOUND | IDENTIFICATION NUMBER m OF BASE STATION IN SERVICE ZONE IN WHICH THIS STATION IS CURRENTLY LOCATED | IDENTIFICATION NUMBER n OF CONTROL STATION TO WHICH THE BASE STATION IN SERVICE ZONE IN WHICH THIS STATION IS CURRENTLY LOCATED IS CONNECTED | IDENTIFICATION NUMBER o OF REPEATER STATION TO WHICH THE BASE STATION IN SERVICE ZONE IN WHICH THIS STATION IS CURRENTLY LOCATED IS CONNECTED |
|---|---|---|---|---|

FIG. 8

| | | |
|---|---|---|
| MOBILE STATION IDENTIFICATION NUMBER / k1 | TIME-POINT t1 | POSITION INFORMATION m1, n1, o1 |
| | TIME-POINT t2 | POSITION INFORMATION m2, n2, o2 |
| | ⋮ | ⋮ |
| | TIME-POINT tN | POSITION INFORMATION mN, nN, oN |
| MOBILE STATION IDENTIFICATION NUMBER / k2 | TIME-POINT t1 | POSITION INFORMATION m1, n1, o1 |
| | TIME-POINT t2 | POSITION INFORMATION m2, n2, o2 |
| | ⋮ | ⋮ |
| | TIME-POINT tN | POSITION INFORMATION mN, nN, oN |
| ⋮ | ⋮ | ⋮ |
| MOBILE STATION IDENTIFICATION NUMBER / kN | TIME-POINT T1 | POSITION INFORMATION m1, n1, o1 |
| | TIME-POINT T2 | POSITION INFORMATION m2, n2, o2 |
| | ⋮ | ⋮ |
| | TIME-POINT TN | POSITION INFORMATION mN, nN, oN |

FIG. 9A

| TELEPHONE NUMBER OF REMOTE PARTY | IDENTIFICATION NUMBER k OF MOBILE STATION |
|---|---|
| | |

FIG. 9B

| REGISTERED POSITION INFORMATION REQUEST NUMBER | IDENTIFICATION NUMBER k OF MOBILE STATION | IDENTIFICATION NUMBER ℓ OF REPEATER STATION OF NETWORK TO WITCH THIS STATION'S HOME MEMORY STATION BELONGS |
|---|---|---|
| | | |

FIG. 10

| IDENTIFICATION NUMBER OF REPEATER STATION | ZONE | IDENTIFICATION NUMBER OF CONTROL STATION | ZONE | IDENTIFICATION NUMBER OF BASE STATION | ZONE |
|---|---|---|---|---|---|
| 01 | TOKYO | n1 | KONAN-KU | m1 | OKUBO-CHO |
| 0 | KANAGAWA PREFECTURE | n | KOTO-KU | m2 | IKEBE-CHO |
| ... | ... | ... | ... | ... | ... |

MOBILE COMMUNICATION SYSTEM INCLUDING RADIO SET HAVING DETECTING REGISTERED POSITION INFORMATION FUNCTION

BACKGROUND OF THE INVENTION

1. Field of the Invention

The present invention relates to a mobile communication system, and more particularly to a mobile communication system in which position registration of a radio set is performed.

2. Description of the Related Art

In order to achieve rapid call origination from the telephone sets and rapid handling of incoming calls to the telephone sets, conventional mobile communication systems provided with radio sets, for example, car telephone sets, (hereinbelow referred to as telephone sets) are equipped with a home memory station which stores the constantly changing current position of each individual telephone set, and a plurality of base stations provided at practically fixed intervals and connected by radio to the telephone sets. Furthermore, when such a telephone set forming part of a mobile communication system moves through the service zone of a base station and, while this movement is taking place, there is a request to alter the base station to which the telephone set is connected by radio, a base station alteration request signal is sent to the base station. When the control station of the mobile communication system receives through a base station a base station alteration request signal, the control station changes over the radio connection from the base station that is currently connected by radio with the telephone set to the base station at the destination of the movement of the telephone set. The home memory station stores the current location of the telephone set by storing the base station that is connected by radio with the telephone set after this changeover has taken place.

However, with this method in which the location of the telephone set is registered, since the control station changes over base stations when a base station changeover request signal is received, if the power source of the telephone set is OFF, even though the movement of the telephone set ought to have resulted in an alteration of the base station to which the telephone set is to make radio connection, the telephone set is not in fact capable of sending a base station alteration request signal. As a result, the control station cannot change over the base station in the telephone set system. Furthermore, the home memory station cannot of course store the current location of the telephone set. This therefore results in the problem that in the event of a call origination request from the telephone set or an incoming call to the telephone set occurring immediately after the telephone set power source has been turned ON, the mobile communication system could not immediately detect the current location of the telephone set thus, with the conventional position registration method, call origination and incoming call handling of the telephone set are subject to delay.

In order to solve the problem described above, the "searching and tracking" incoming call system described for example in unexamined Japanese Patent Publication No. H5-327888 is known, using a plurality of items of registered position information.

In the incoming call system described in this specification, not only the current location of the telephone set is stored in a position information data base, but also past position information is stored. Consequently, even if turning the power source of the telephone set OFF has made it impossible for the mobile communication system to follow the destination of movement of the telephone set, the mobile communication system infers the destination of the movement of the telephone set from the information regarding past locations of the telephone set which is stored in the position information database, so even if a call origination request is received from the telephone set or an incoming call request is made to the telephone set immediately after turning the power source of the telephone set ON, the current location of the telephone set can be immediately inferred and detected and the system is therefore able to respond to the call origination or incoming call handling.

However, with the incoming call handling system as described in this specification, even though the mobile communication system stores the current and previous position information, the telephone set cannot itself detect its own current and past locations.

SUMMARY OF THE INVENTION

It is an object of the present invention to provide a mobile communication system including a radio set provided with a registered position information detection function whereby the aforesaid problem is solved and wherein the position information regarding the current location of the radio set can be detected.

It is another object of the present invention to provide a mobile communication system including a radio set having a registered position information detection function wherein the history of movement of the radio set can be detected.

In order to achieve the objects described above, in a mobile system including a radio set and having a registered position information detection function according to the present invention, there are provided, on the communication network side of the system, first storage means that stores, as registered position information, the current position of a radio set and previous positions of the radio set; and transmission means that transmits registered position information stored in the first storage means on receiving a registered position information request signal requesting registered position information from a radio set.

For its part, a radio set is provided with transmission means that transmits a registered position information request signal and a second storage means that stores the registered position information which it receives.

In accordance with the construction as described above, when a radio set requests registered position information, a registered position information request signal is transmitted to the networkside system and, in response to this, the network-side system sends registered position information to the radio set, which stores this registered position information; the user of the radio set is thereby able to ascertain his own current location and past locations.

BRIEF DESCRIPTION OF THE DRAWINGS

FIG. 2 is a block diagram of an example of the circuit arrangement of a mobile communication system according to the present invention;

FIG. 3 is a functional block diagram of a car telephone set constituting an example of a mobile station employed in the mobile communication system according to the present invention;

FIGS. 7A, 7B and 7C illustrate a current position write request signal from a mobile station;

FIG. 8 illustrates an example of a memory table relating to storage of one item of mobile station information in the home memory station;

FIGS. 9A and 9B illustrate the information contained in the up control signal on call origination by a mobile station;

FIG. 10 illustrates an example of a conversion table stored in fourth storage unit of a car telephone;

DETAILED DESCRIPTION OF THE PREFERRED EMBODIMENTS

The present invention will now be described in detail with reference to the drawings. In the present embodiment, a car telephone set (hereinbelow referred to simply as a telephone set) is described as an example of a radio set.

Figure 1:
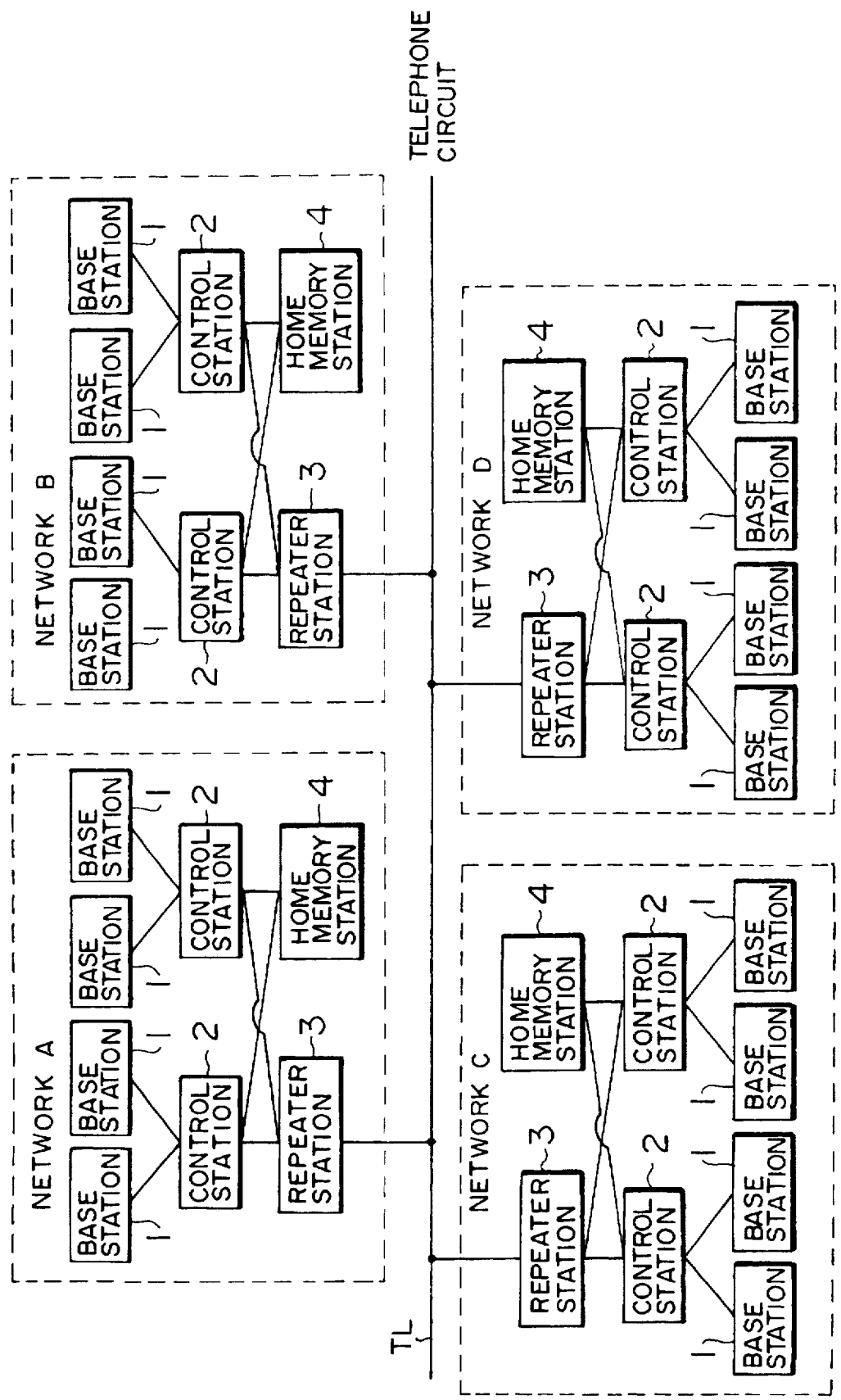
FIG. 1 illustrates a diagram of a mobile communication system according to the present invention.

FIG. 1 is a view illustrating an example of the layout of a communication system in a mobile communication network.

In this drawing, each communication network A, B, C and D comprises, as an example four base stations 1, two control stations 2, a repeater station 3 and a home memory station 4.

The detailed operation of a base station 1 will be described later, but a simple explanation is given below. Base station 1 is connected by radio to mobile stations (not shown) such as telephone sets, but is hard-wired and thus connected to control station 2. Base station 1 sends down control signals containing its own identification number to a mobile station present in its own service zone. Also, when base station 1 receives an up control signal comprising a current position write request signal or registered position information request signal from a mobile station, it sends the current position write request signal or registered position information request signal to control station 2. Also, when base station 1 receives a registered position information signal from control station 2, it sends to the mobile station an up control signal containing this registered position signal.

Control station 2 is hard-wired and thus connected to base station 1, repeater station 3 and home memory 4. Control station 2 changes over base station 1 with which a mobile station is in radio connection. Furthermore, when control station 2 receives a current position write request signal or registered position information request signal from base station 1, it transmits this to repeater station 3. Furthermore, control station 2 sends the registered position information signal from repeater station 3 to base station 1.

Repeater station 3 is hard-wired and thus connected to control station 2 and telephone circuit TL. When repeater station 3 receives from control station 2 a current position write request signal or registered position information request signal, it sends this signal to repeater station 3 of a network including home memory station 4 to which the mobile station belongs. Also, repeater station 3 transmits to control station 2 registered position information signal from repeater station 3 of a network containing the home memory station 4 to which the mobile station belongs.

Home memory station 4 is in wired connection with control station 2. When home memory station 4 receives a current position write request signal through the control station 2 and repeater station 3 belonging to its own network, the home memory station 4 writes the current position of the mobile station. When home memory station 4 receives registered position information request signal through the control station 2 and repeater station 3 of the network to which home memory station 4 belongs, the home memory station 4 sends the registered position information signal to repeater station 3 of the network in which the mobile station is currently located, through this control station 2 and repeater station 3. It should be noted that one mobile station is registered beforehand in one home memory station; this home memory station also stores position information of mobile stations in networks other than that to which the home memory station itself belongs.

Next, the circuit arrangement and operation of a mobile communication system according to the present invention will be described with reference to FIG. 2.

The mobile communication system is constituted by a plurality of base stations 1a, 1b, . . . constituting a single communication network (for example communication network A) shown in FIG. 1, a single repeater station 3 of a plurality of control stations 2a, 2b, . . . , and a single home memory station 4; however, since the construction of base stations 1a, 1b, . . . and the construction of control stations 2a, 2b, . . . are exactly the same, FIG. 2 only shows the internal structure of each one of these stations respectively.

Communication with a car telephone set 5 making use of a mobile communication system comprises both up service in which a remote party is called from car telephone set 10, and down service in which a remote party calls car telephone set 5. However, since the signal processing is simply reversed, only the up service will be described.

In base station 1a, there are provided a common radio amplifier (CAMP) 11, a radio transceiver (TRX) 12, and composite multiplexing transmitter (MUX) 13. A service signal including a control signal from car telephone 5 constituting the mobile station is first of all amplified by common radio amplifier 11, then demodulated by radio transceiver 12, multiplexed by composite multiplexing transmitter 13, and thereby transmitted to control station 2a through a transmission path. The multiplexed service signal from base station 1a is decoded in control station 2a by means of transcoder (TRAU) 21 and is switched by time division switch (TDSW) 22 under the control of base station 'processor (BSP) 23, before being transmitted to repeater station 3. The multiplexed control signal from base station 1a is transmitted to base station processor 23 by control station 2a through transcoder 21 and time division switch 22. The decoded signal that is output from control station 2a is switched by time division switch matrix (TDSM) 33 under the control of call processing processor (CLP) 32, and is sent to telephone network telephone circuit TL through digital transmission interface (DTI) 31 of repeater station 3.

Under the control of base station processor 23 of control station 2a, home memory station 4 stores in memory (HLR) 41 the position information of car telephone set 5; this information is based on the registered position signal contained in the control signal from car telephone set 5.

FIG. 3 is a functional block diagram of a telephone set constituting a mobile station employed in an embodiment of a mobile communication system according to the present invention.

In the drawing, antenna 101 outputs the down signal from the base station to radio unit 102 and transmits to the base station the up control signal from radio unit 102. Radio unit 102 demodulates the down control signal and outputs this demodulated signal to control unit 103 and modulates the signal from control unit 103 before outputting this modulated signal to radio unit 102 as up control signal.

First storage unit 107 stores an identification number of its own telephone set. Second storage unit 108 stores the identification number of the repeater station 3 of the network to which this telephone set i.e. its own telephone set belongs. Third storage unit 109 stores the identification number of the base station 1 in whose service zone this telephone set is currently located. Fourth storage unit 110 stores a conversion table for converting the registered position information signal into position information. Fifth storage unit 111 stores the registered position information signal.

Key pad unit 104 is operated by the telephone set user when dialing the telephone number of a remote party or when requesting registered position information.

Display unit 105 displays the position information.

When the base station identification number from a base station 1, which is input through antenna 101 and radio unit 102, changes, control unit 103 reads the mobile station identification number and the repeater station identification number of the network including the home memory station 4 to which it itself belongs, which are stored in first and second storage units 107 and 108. After this, control unit 103 outputs a current position write request signal consisting of this identification number and the identification number of the base station 1 that is currently being received. After output of this signal, control unit 103 replaces the base station identification number stored by third storage unit 109 by the identification number of the base station that is currently being received.

When key pad unit 104 is operated, control unit 103 reads the mobile station identification number and the repeater station identification number of the network including the home memory station 4 to which it itself belongs, which are stored in first and second storage units 107 and 108. When the telephone number of a remote party is dialled, control unit 103 then effects ordinary call origination; when registered position information is requested, control unit 103 outputs registered position information request signal, to originate a registered position information request.

When a registered position information signal is input through antenna 101 and radio unit 102, control unit 103 stores the registered position information signal in fifth storage unit 111. Also at this point, control unit 103 reads the conversion table that is stored in fourth storage unit 110, to convert the registered position information signal into position information, which is then displayed on display unit 105.

Figure 4A:
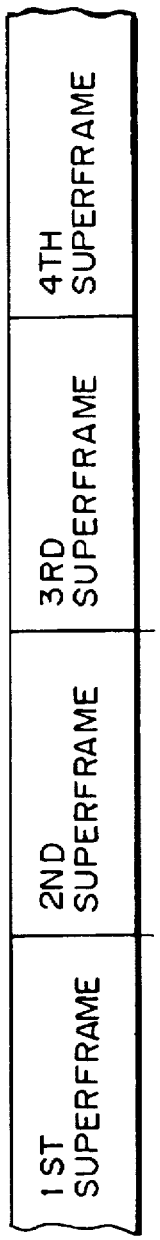
FIGS. 4A, 4B and 4C show the signal format of up control signals employed in the present invention.
Figure 4B:
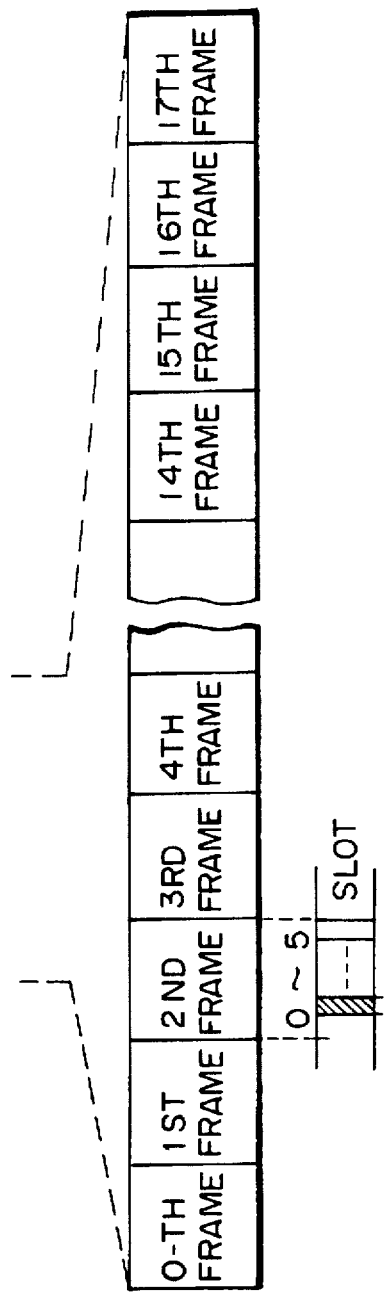
Figure 4C:
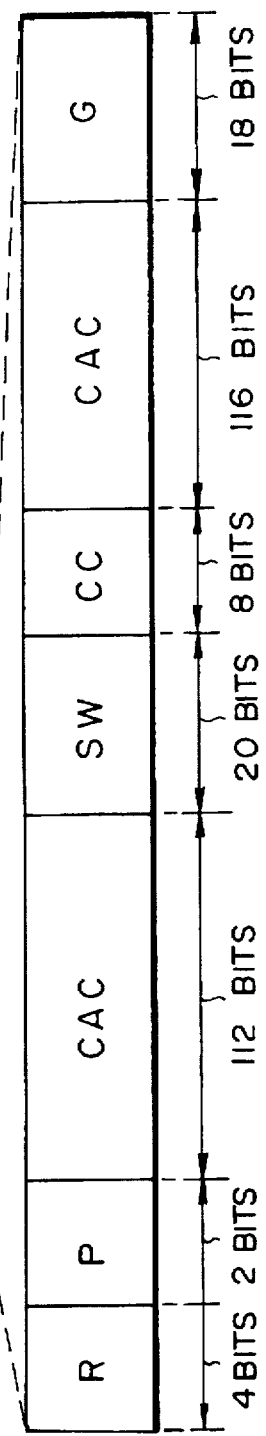
Figure 5A:
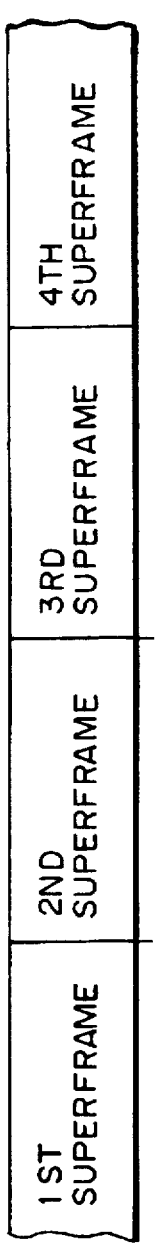
FIGS. 5A, 5B and 5C show the signal format of down control signals used in the present invention.

FIGS. 4A, 4B, 4C and FIGS. 5A, 5B, 5C are views illustrating the signal format of the up and down control signals employed in the present invention. FIG. 4A is the same as FIG. 5A, and FIG. 4B is the same as FIG. 5B.

It should be noted that this embodiment is based on digital type car telephone system standard RCR STD-27B and will be explained below.

Figure 5B:
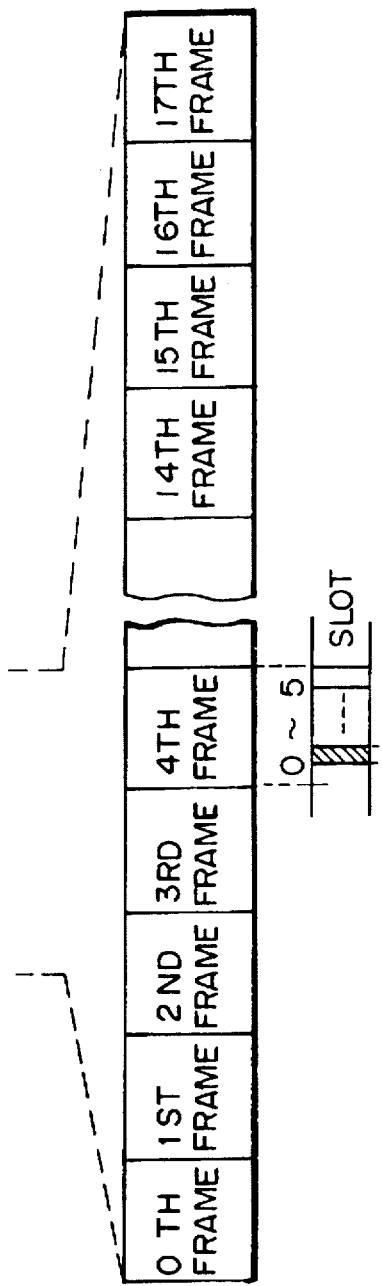

As can be seen from FIG. 4A and FIG. 4B and from FIG. 5A and FIG. 5B, a control signal is constituted by a plurality of "super frames", each super frame comprises frames 0 to 17. These frames are constituted by slots 0 to 5.

Now, in FIG. 4C, a reception frame is provided with a guard time R constituted by four spare bits for burst transition response, followed by a two-bit preamble P. After preamble P come a 112 bit control signal CAC for monitoring the radio and the call, and a 20-bit synchronization word SW. Further, after the synchronization word SW, there is an 8-bit color code CC including a base station identification number and registered position information signal, a 116-bit control signal CAC, and an 18-bit guard time G.

Figure 5C:
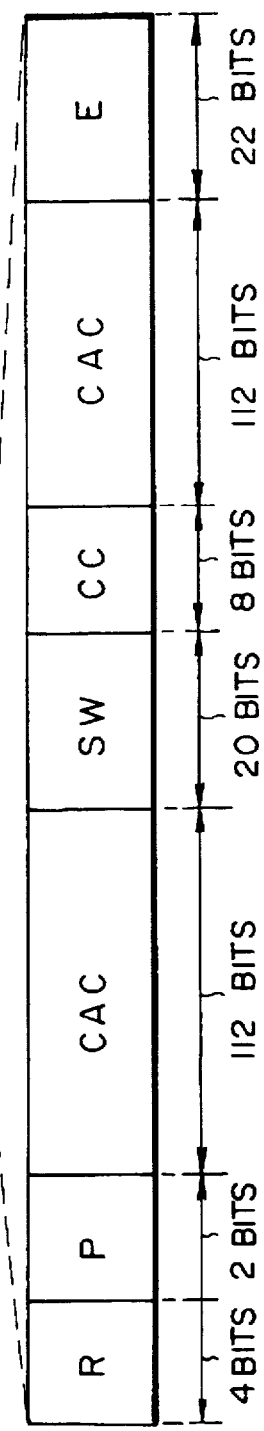

On the other hand, in FIG. 5C, in the down slot, there is a guard time R constituted by four spare bits for burst transition response, followed by a 2-bit preamble P. After the preamble P, there is a 112-bit control signal CAC for monitoring the radio and call, and a 20-bit synchronization word SW. After the synchronization word SW, come an 8-bit color code CC including a current position write request signal and registered position information request signal, a 112-bit control signal CAC, and 22 collision-control bits E.

Figure 6A:
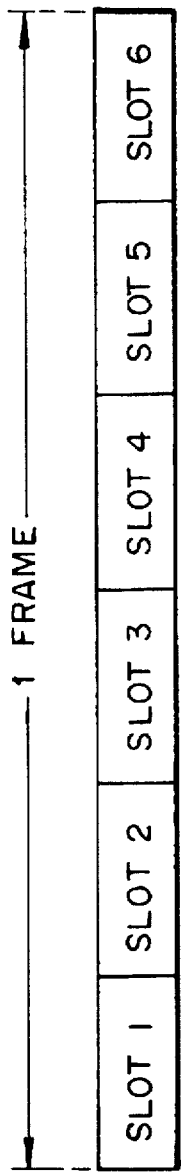
FIGS. 6A, 6B and 6C show the signal format of up and down control signals for use in U.S. analog/digital communication system.
Figure 6B:
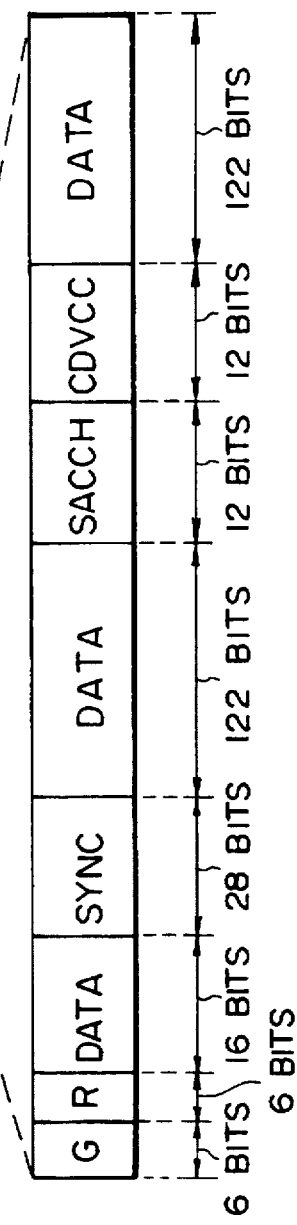
Figure 6C:
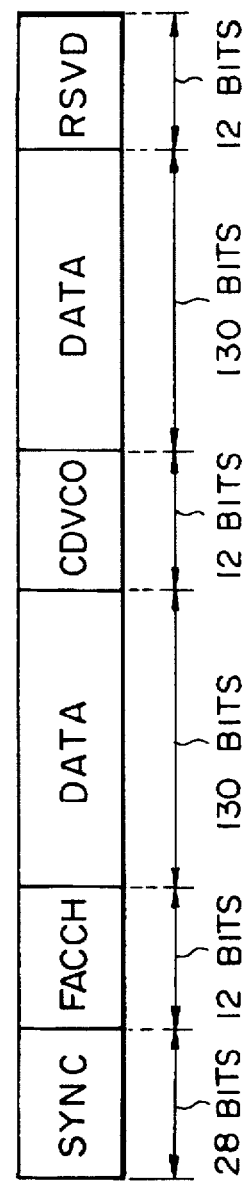

FIGS. 6A, 6B and 6C illustrate the signal format of the up and down control signals for use in U.S. analog/digital communication system.

FIG. 6A illustrates one frame of the control signal which includes six slots and FIGS. 6B and 6C illustrate signal formats of the up and the down control signals, respectively. As shown in FIG. 6B, the up control signal includes in its one slot guard time G (6 bits), ramp time R (6 bits), data DATA (16 bits) comprising a call signal, a synchronizing signal SYNC (28 bits) for synchronizing with a base station, another data DATA (16 bits), a control signal SACCH (12 bits), a base station discrimination code CDVCC (12 bits) and further data DATA (122 bits).

As shown in FIG. 6C, the down control signal includes in one slot a synchronizing signal SYNC (28 bits) for synchronizing with a base station, a control signal FACCH (12 bits), data DATA (130 bits) comprising a call signal, a base station discrimination code CDVCC (12 bits), data DATA (130 bits) comprising a call signal and reservation bit RSVD (12 bits).

FIGS. 7A, 7B and 7C are signal diagrams illustrating a current position write request signal from a mobile station.

As shown in FIG. 7A, current position write request signal includes a mobile station identification number k, repeater station identification number 1 of the network in which the home memory station of its own mobile station is to be found, and the identification number m of the base station in whose service zone the mobile station is currently located.

Also, when control station 2 receives current position write request signal through base station 1, as shown in FIG. 7B, control station 2 appends an identification number n of its own station and outputs this to repeater station 3. Further, when repeater station 3 receives current position write request signal, as shown in FIG. 6C, repeater station 3 appends the identification number 0 of its own station and outputs it to repeater station 3 of the network containing the home memory station 4 to which the mobile station belongs.

FIG. 8 is a view illustrating an example of a memory table in the home memory station for storage of registered position information of mobile stations. In the present figure, a mobile station having an identification number k1 sends a current position write request signal at time point t1; in this case, this indicates that the mobile station is located in the service zone of a base station m1 of the network containing control station n1 and repeater station o1. Likewise in the present figure, the mobile station having identification number k1 sends a current position write request signal at time point tN; the mobile station is now located in the service zone of base station mN of the network containing control station nN and repeater station oN. In addition, FIG. 8 shows that a mobile station having an identification number kN sends a current position write request signal at time point TN, and, at this time point, the mobile station is located in the service zone of base station mN of the network containing control station nN and repeater station oN.

FIGS. 9A and 9B are illustration of the information contained in the up control signal CAC on call origination by a mobile station.

As shown in FIG. 9A, when a mobile station performs ordinary call origination i.e. makes a request for service, the up control signal CAC contains the telephone number of the remote party requested and the mobile station identification number k.

In contrast, as shown in FIG. 9B, when a mobile station originates a request for registered position information i.e. transmits a registered position information request signal, the registered position information request signal contained in the up control signal CAC includes a registered position information request number and repeater station identification number 1 of the network in which is to be found the home memory station of the mobile station in question.

FIG. 10 is a view illustrating an example of a conversion table stored in the fourth storage unit 110 (see FIG. 3) of a telephone set.

In the drawing, repeater station o1 is converted to Tokyo and repeater station o2 is converted to Kanagawa Prefecture. Also, control station identification number n1 is converted to Konan-ku and n2 is converted to Koto-ku. Also, base station identification number m1 is converted to Okubo-cho and m2 is converted to Ikebe-cho.

Next, the operation will be described.

First, the operations of changeover of base station 1 with which mobile station 5 is in radio connection and the operation of writing the current position of mobile station 5 stored by home memory station 4, which occur on movement of mobile station 5, will be described using FIG. 10.

Figure 11:
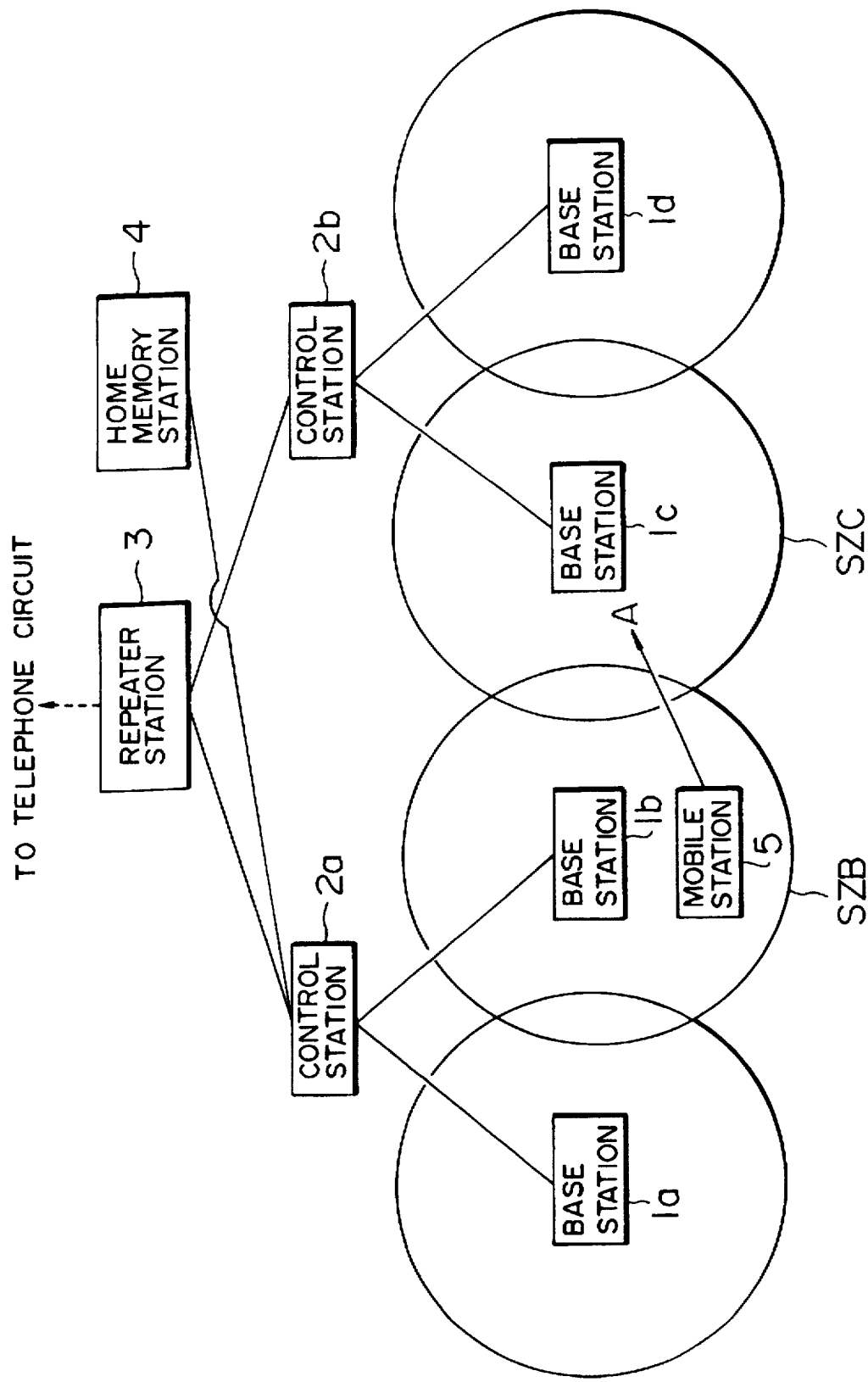
FIG. 11 is a view explaining the operations of changeover of a base station to which radio connection is made on movement of a mobile station and of writing the current position of the mobile station stored in home memory.

Referring to FIG. 11, mobile station 5 is now within service zone SZB indicated by the circle and that includes base station 1b, and is in receipt of the identification signal of base station 1b contained in down control signal CAC. After this, moblile station 5 moves as shown by arrow A towards service zone SZC including base station 1c; mobile station 5 is then in receipt of the identification signal of base station 1c contained in down control signal CAC. When this happens, mobile station 5 detects the change in the identification signal that it receives, and inserts a current position write request signal into the up control signal CAC that it sends to base station 1b.

This current position write request signal is received by repeater station 3 through control station 2a. Repeater station 3 then issues a command to control station 2a and control station 2b to effect changeover of the base station that is in radio connection with mobile station 5 from base station 1b to base station 1c. In addition, in response to the detection of the identification number of home memory station 4 to which mobile station 5 belongs, which is contained in the current position write request signal, repeater station 3 sends a current position write request signal to the repeater station 3 that is in the network that includes the home memory to which mobile station 5 belongs. Repeater station 3 that is connected to this home memory station 4 then sends the current position write request signal to home memory station 4 through control station 2. As illustrated in the memory table of FIG. 8 previously described, for every mobile station identification number, home memory station 4 writes the identification number of the base station 1 in which the mobile station is currently to be found, the identification number of the control station 2 that is in wired connection with this base station 1, and the identification number of repeater station 3: these constitute the information regarding time point and position at which the write request signal was received.

Figure 12:
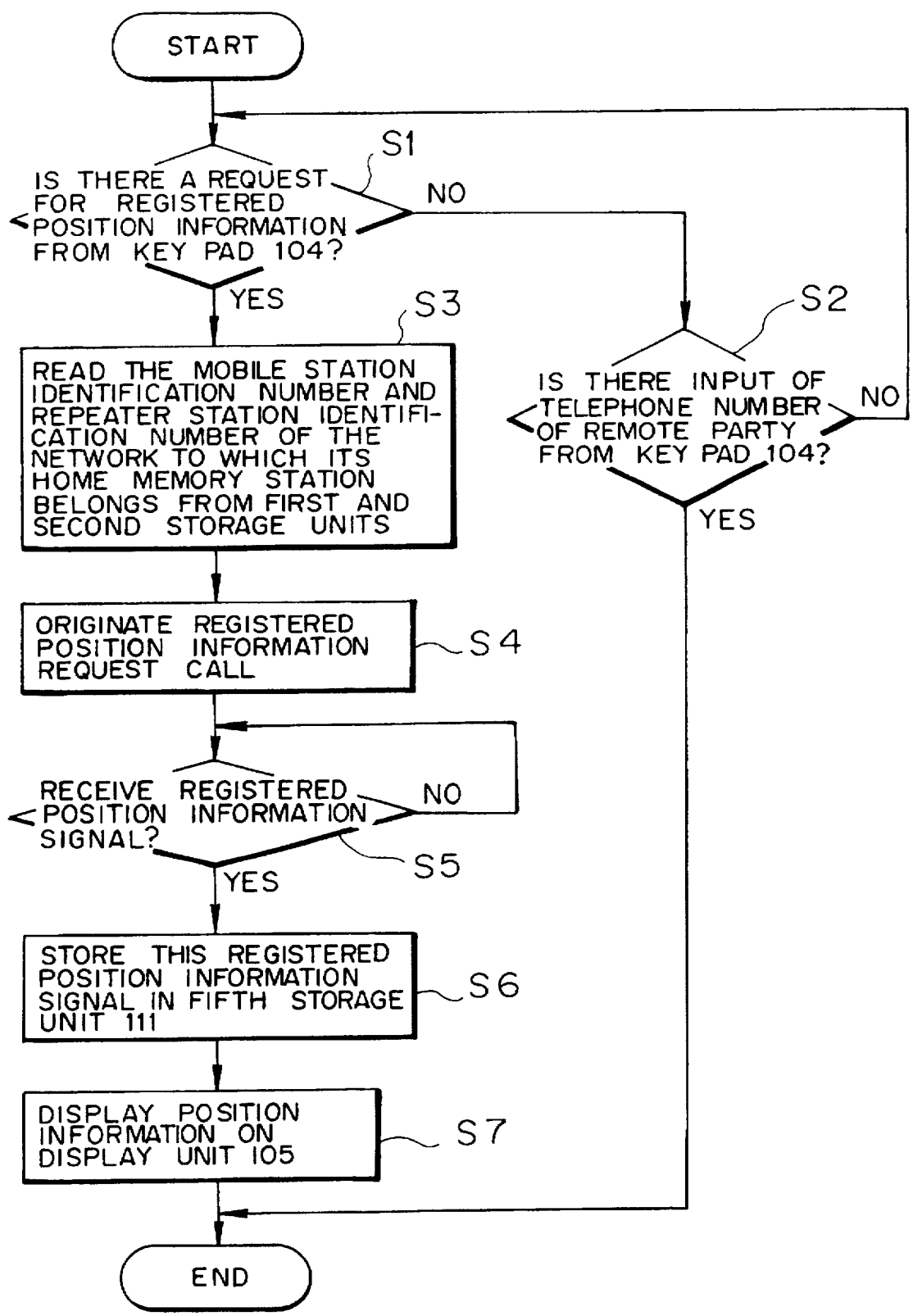
FIG. 12 illustrates a flow chart explaining call origination operation by a car telephone in the present invention.

Next, the call origination action of the telephone set will be described with reference to the flow chart shown in FIG. 12.

Referring to the drawings, mobile station 5 is in radio connection with base station 1 that is in the service zone in which mobile station 5 is located, and mobile station 5 is in incoming call waiting condition.

First, control unit 103 detects input of a registered position information request from key pad unit 104 i.e. a predetermined registered position information request number as shown in FIG. 9B (S1). If control unit 103 does not detect a registered position information request number, it detects input of a remote party telephone number from key pad unit 104 (S2). When control unit 103 detects this telephone number, it performs the ordinary call origination operation. However, the object of this embodiment is to get the telephone set to receive the registered position information signal, so this ordinary call origination operation will not be described and it will be assumed that at this point the telephone set ceases operation.

However, if control unit 103 does not detect such a telephone number, the telephone set returns once more to the operation of step S1.

When control unit 103 detects a registered position information request number in step S1, it reads the mobile station identification number k and repeater station identification number 1 of the network to which its home memory station belongs from first and second storage units 107 and 108 (S3). Control unit 103 then outputs the registered position information request number, mobile station identification number k and the identification number 1 of the repeater of the network to which its home memory station belongs, and effects through radio unit 102 and antenna 101 a transmission including these numbers in color code CC of the up control signal i.e. it originates a registered position information request (S4).

The registered position information request number, the mobile station identification number k, and the repeater station identification number 1 of the network to which its home memory station belongs are transmitted to repeater station 3 through base station 1 and control station 2. In response to detection of the registered position information request signal, repeater station 3 transmits to the repeater station 3 in the network including the home memory station to which the mobile station 5 belongs the registered position information request number and mobile station identification number k. It should be noted that this action is the same as the action in the exchange of an ordinary telephone set. Repeater station 3 in the network containing the home memory station to which the mobile station belongs transmits to home memory station 4 these registered position information request number and mobile station identification number k, through control station 2. On receipt of this number, home memory station 4 transmits to repeater station 3 through control station 2 of the same network as this home memory station 4 registered position information of the mobile station designated by the mobile station identification number indicated in FIG. 8 and the registered position information signal containing the time point to which this relates. When it has received the registered position information signal, repeater station 3 transmits this registered position information signal to the repeater station of the network to which base station 1 belongs that is currently in radio connection with mobile station 5. This repeater station 3 then transmits the registered position information signal to base station 1 through control station 2. Base station 1 includes the registered position information signal in the down control signal CAC and transmits the signal to mobile station 5.

When control unit 103 of mobile station 5 receives the registered position signal contained in down control signal CAC through antenna 101 and radio unit 102 (S5), it causes this registered position information signal to be stored in fifth storage unit 111 (S6). Control unit 103 then uses the conversion table stored in fourth storage unit 110 to convert the registered position information signal into position information, which is displayed on display unit 105 (S7). After this display, the telephone set terminates its operation.

It should be noted that, although this embodiment was described with reference to a digital type car telephone system standard RCR STD-27B, the present invention is not restricted to such a standard in any way and could be employed generally in any telephone system in which current position registration of the telephone set is performed.

Furthermore, if the fifth storage unit 111 is constituted by a removable card-type memory, the registered position information signal could be transferred for example to a personal computer. Consequently, such a personal computer could display the position information and perform processing using the registered position information signal: for example, it could enable the user of the telephone set to ascertain the history of movement of the car.

As described above, with the mobile communication system including a radio set having a registered position information receiving function according to the present invention, the mobile communication system stores the current and past positions of the radio set; thus, the radio set can receive, store and display current and past locations received from the mobile communication system. Consequently, the benefit is therefore obtained that the user of such a radio set can ascertain the history of his own movement.

What is claimed is:

1. A mobile communication system comprising a radio set and a network-side system, wherein said network-side system comprises:

first storage means for storing as registered position information the current and previous positions of said radio set;

transmission means for transmitting the registered position information stored in said first storage means when receiving a registered position information request signal requesting registered position information from said radio set;

a repeater station that is coupled to an ordinary telephone circuit;

base stations;

a control station for changing over one of the base stations that is in radio connection with said car telephone set; and a home memory station for performing position registration of said car telephone set; and wherein said radio set is a car telephone set and comprises transmission means for transmitting said registered position information request signal; and said second storage means for storing said received registered position information.

2. A mobile communication system according to claim 1, in which said first storage means is said home memory station.

3. A mobile communication system according to claim 2, wherein said registered position information request signal includes the identification number of said car telephone set, the identification number of said home memory station, and the registered position information request number.

4. A method of receiving registered position information of a radio set, comprising:

a first step wherein a car telephone set detects the change of the identification number of the base station received from a first base station identification number of a first base station to a second base station identification number of a second base station;

a second step wherein said car telephone set transmits to said first base station a registered position write request signal including said second base station identification number in order to request writing of the registration of the current position, in response to said detection;

a third step in which a first control station receives said registered position write request signal from said first base station;

a fourth step in which, in response to receipt of said registered position write request signal, said first control station changes over the radio connection of said car telephone set from said first base station to said second base station;

a fifth step in which the home memory station to which said car telephone set belongs receives said registered position write request signal through said first control station, a first repeater station included in the network to which said first control station belongs, a second repeater station included in the network to which said home memory station belongs, and a second control station;

a sixth step wherein, in response to receipt of said registered position write request signal, said home memory station writes said current position of said car telephone set as time point and position information as said second base station identification number;

a seventh step in which said car telephone set transmits to said second base station a registered position information request signal requesting transmission of registered position information indicating the history of the position of said car telephone set that was stored by said home memory station;

an eighth step wherein said memory home station receives said registered position information request signal through said second base station, said first control station, said first repeater station, said second repeater station and second control station;

a ninth step wherein said home memory station transmits to said second control station said registered position information in response to receipt of said registered position information request signal;

a tenth step wherein said car telephone set receives said registered position information through said second repeater station, said first repeater station, said first control station and said second base station; and an eleventh step in which said car telephone set stores said registered position information.

5. A method of receiving registered position information of a radio set according to claim 7, wherein said car telephone set is provided with a twelfth step in which said registered position information is displayed.

6. A method of receiving registered position information of a radio set according to claim 5, wherein said seventh step includes:

a thirteenth step of dialling a predetermined registered position information request number; and a fourteenth step of generating said registered position information request signal from said registered position information request number, said car telephone set identification number, and the identification number of said home memory station.

* * * * *

UNITED STATES PATENT AND TRADEMARK OFFICE
CERTIFICATE OF CORRECTION

PATENT NO. : 5,787,359
DATED : July 28, 1998
INVENTOR(S) : Kimitaka NAGATA

It is certified that error appears in the above-identified patent and that said Letters Patent is hereby corrected as shown below:

On the title page,

In Item No. [30], Foreign Application Priority Data, change

"Mar. 10, 1996 [JP] Japan…………………..7-050701" to

-- Mar. 10, 1995 [JP] Japan…………………..7-050701--.

Signed and Sealed this

Twenty-seventh Day of April, 1999

Attest:

Q. TODD DICKINSON

Attesting Officer

Acting Commissioner of Patents and Trademarks